United States Patent
Bosio

[11] Patent Number: 5,975,570
[45] Date of Patent: Nov. 2, 1999

[54] COMPRESSED GAS STORAGE MEANS FOR A VEHICLE OCCUPANT RESTRAINING SYSTEM

[75] Inventor: Allen Charles Bosio, Leinzell, Germany

[73] Assignee: TRW Occupant Restraint Systems GmbH, Alfdorf, Germany

[21] Appl. No.: 08/963,968

[22] Filed: Nov. 4, 1997

[30] Foreign Application Priority Data

Nov. 8, 1996 [DE] Germany ............... 296 19 437

[51] Int. Cl.⁶ .................................................. B60R 21/26
[52] U.S. Cl. ........................................................ 280/741
[58] Field of Search ................................................ 280/741

[56] References Cited

U.S. PATENT DOCUMENTS

| | | | |
|---|---|---|---|
| 3,316,691 | 5/1967 | Sesny et al. | 55/66 |
| 4,414,005 | 11/1983 | DeBievre et al. | 55/75 |
| 4,495,900 | 1/1985 | Stockmeyer | 123/1 A |
| 4,836,255 | 6/1989 | Schneiter et al. | 280/741 |
| 5,031,932 | 7/1991 | Frantom et al. | 280/741 |
| 5,275,433 | 1/1994 | Klober et al. | 280/741 |

FOREIGN PATENT DOCUMENTS

| | | |
|---|---|---|
| 0049936 | 4/1982 | European Pat. Off. |
| 2458741 | 1/1981 | France |
| 1231784 | 5/1971 | United Kingdom |

*Primary Examiner*—Kenneth R. Rice
*Attorney, Agent, or Firm*—Tarolli, Sundheim, Covell, Tummino & Szabo LLP

[57] ABSTRACT

A compressed gas storage means for a vehicle occupant restraining system comprising a storage container having a chamber formed therein, the chamber containing gas stored under a high pressure and having an internal wall surface bearing a coating of a material with a high specific surface area.

4 Claims, 2 Drawing Sheets

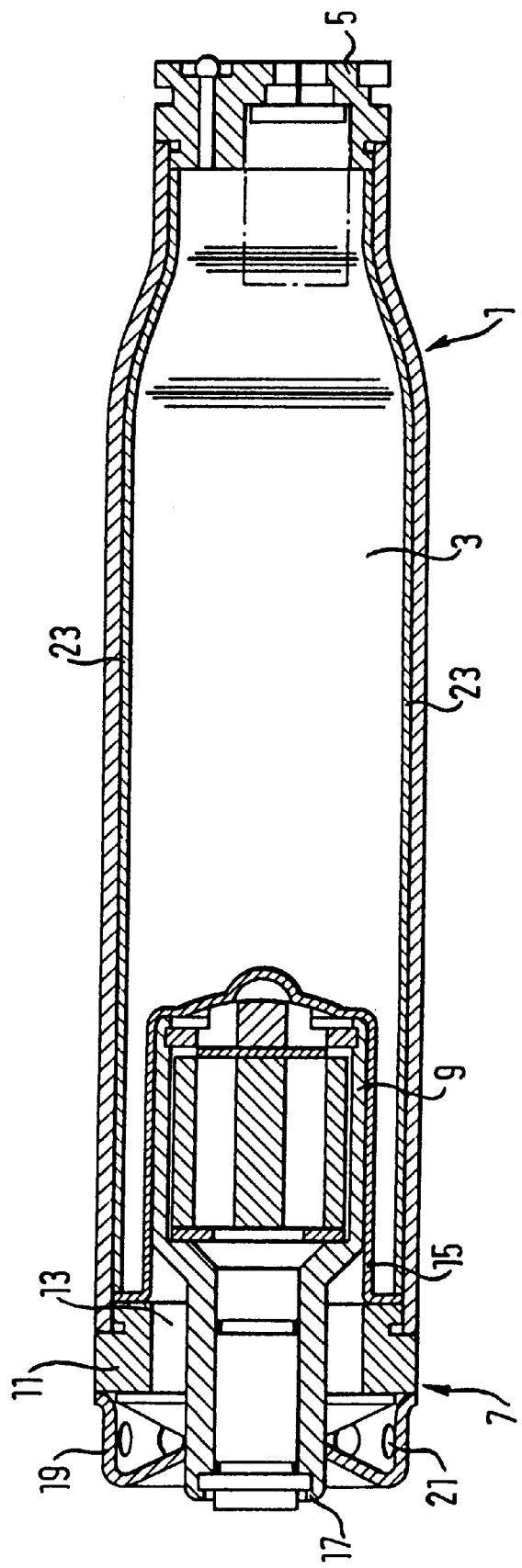

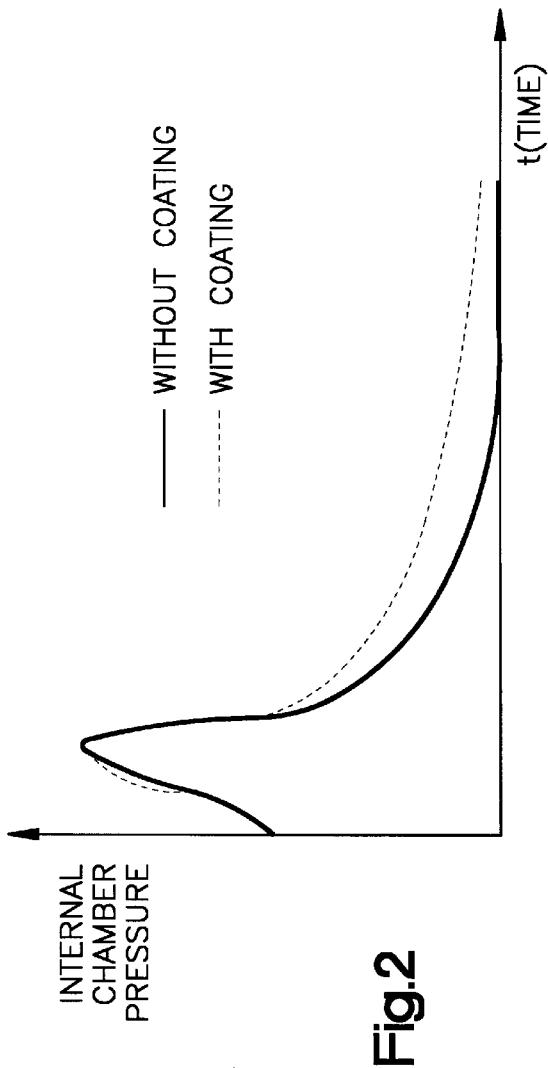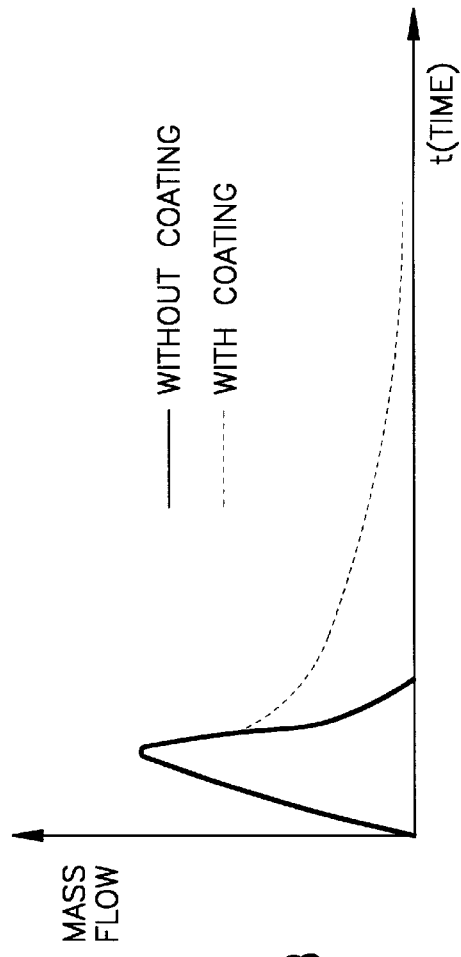

COMPRESSED GAS STORAGE MEANS FOR A VEHICLE OCCUPANT RESTRAINING SYSTEM

FIELD OF THE INVENTION

The invention relates to a compressed gas storage means for a vehicle occupant restraining system comprising a storage container having a chamber containing gas stored under high pressure.

BACKGROUND ART

Compressed gas storage means, more especially for the inflation of a gas bag for a vehicle occupant restraining system, are opened in a crash by activation of small pyrotechnic charge so that the gas stored in the storage container may escape and cause deployment of the gas bag. In this respect the gas bag must completely deploy within an extremely short period of time, a high gas pressure being required for rapid filling of the gas bag and such gas pressure must be maintained in the final phase of deployment as well. A gas pressure which is only high at the outset on the contrary tends to be an obstacle for the initial part of deployment and is unable to ensure full deployment of the gas bag.

SUMMARY OF THE INVENTION

The invention is to provide a compressed gas storage means, in the case of which, without any change in volume, a larger amount of gas may be stored so that in the final phase of the deployment operation there is still sufficient gas for complete deployment of the gas bag. In the case of a compressed gas storage means of the type initially mentioned this is rendered possible by the invention because the inner wall surface of the chamber bears a coating of a material with a high specific surface area. Preferably, the material possesses a specific surface area within a range of 200 to 400 m$^2$/g. In a particularly preferred embodiment of the invention the said material is an oxide or a molecular sieve and, most preferred, a zeolite.

Further features and advantages of the invention will be apparent from the following description of a preferred embodiment and from the following drawings, to which reference is had.

BRIEF DESCRIPTION OF THE DRAWINGS

FIG. 1 shows a compressed gas storage means in accordance with the invention as part of a gas bag module, in longitudinal section.

FIG. 2 represents a diagrammatic chart of variations in the internal pressure of the chamber as a function of time.

FIG. 3 is a diagrammatic chart of variations in mass flow from the chamber as a function of time.

DETAILED DESCRIPTION OF THE INVENTION

In FIG. 1 a compressed gas storage means is shown, which serves for the inflation of a gas bag, not illustrated, as part of a complete gas bag module. In the interior of the storage container 1 there is a chamber 3 charged with an inert gas such as for example argon or helium, or with air. However, it would be possible to employ other gases or gas mixtures utilized in industry. The gas stored in the chamber 3 is under a pressure of over 200 bar. A charging end 5 positioned at the front face is located opposite to a discharge end 7. From the discharge end an ignition unit 9 extends into the interior of the chamber 3. The ignition unit 9 comprises a pyrotechnic charge which in a crash is fired in response to a signal. The end wall 11 at the discharge end 7 possesses a plurality of discharge openings 13 distributed evenly about a periphery, such openings being separated in the non-operated state of the unit by a wall 15 from the chamber 3. On a connection pin 17, extending out from the end wall 11, of the ignition unit 9 a diffusor baffle 19 is mounted which has numerous discharge openings 21. This baffle 19 of the storage container 1 extends into the interior of a gas bag, not illustrated, with the storage container and the gas bag forming a gas bag module.

The interior wall surface of the chamber 3 bears a coating 23 of a material with a high specific surface area, preferably a zeolite, the specific surface area of the material preferably being within a range of 200 to 400 m$^2$/g. As a material with a high specific surface area other oxides or molecular sieves may also be employed. The specific surface area of the material may also be larger than 400 m$^2$/g.

The manner of operation of the compressed gas storage means of the invention will be explained in the following:

Owing to the adhesion or adsorption forces acting on the gas molecules the coating 23 applied to the inner wall surface of the chamber 3 renders it possible for there to be a compaction of the gas introduced into the chamber on the surface of the coating until a liquid condition is attained. Accordingly, for the identical volume of the chamber 3 it is possible for a larger quantity of gas to be stored. In a crash the pyrotechnic charge located in the ignition unit 9 will be fired so that additional gas will flow into the interior of the chamber 3. The pressure in the chamber 3 is consequently so increased that the wall 15 will rupture and gas will flow through the discharge openings 13 through the diffusor baffle 19 and via the discharge openings 21 into the interior of the gas bag. With the reduction in the internal pressure the coating 23 will release the gas adsorbed on its surface so that in the final phase of the deployment operation such additional gas will be made available for complete deployment of the gas bag.

FIG. 2 diagrammatically shows the variation in pressure within the chamber 3 as a function of time (t). As described above, the internal pressure in the chamber will rise immediately following activation of the pyrotechnic charge in order, after rupture of the wall 15, to fall again sharply. In the case of a compressed gas storage means without a coating the drop in pressure is sharper or steeper than in the case of compressed gas storage means of the invention and the internal pressure in the chamber approaches the pressure of the surroundings more rapidly. In the final phase of deployment of the gas bag the internal pressure in the chamber of the compressed gas storage means of the invention is hence higher than in compressed gas storage means known so far.

Much the same applies for the variation with time of the mass flow from the chamber 3 as represented diagrammatically in FIG. 3. The release of the pyrotechnic charge firstly leads to a rise in the quantity of gas inside the chamber 3. After the rupture of the wall 15 the gas flows into the gas bag and causes the deployment thereof. However, owing to the adsorption of gas on the coating 23 the liberation of gas is delayed in time so that the final phase of the deployment operation a larger quantity of gas is made available than in the case of customary compressed gas storage means.

Moreover, with the use of the compressed gas storage means of the invention there is a smaller effect of the ambient temperature on the deployment operation, since the coating 23 functions as an accumulator and variations in temperature are more readily compensated for.

For the production of the compressed gas storage means of the invention the chamber 3 is treated with a slurry of the desired zeolite and dried at approximately 500 to 600° C. Preferably coating takes place by suspension of the material utilized for coating having a large specific surface area with the addition of a binding agent and following sintering at a high temperature and, if necessary, in an inert gas atmosphere. Filling of the compressed gas storage means with gas and/or with the pyrotechnic charge is performed using known technology.

Whereas the invention has been described with reference to a compressed gas storage means as a component of a gas bag module, the principle of the coating with a material having a high specific surface area can be employed in any other compressed gas storage means for vehicle occupant restraining systems.

I claim:

1. A compressed gas storage means for a vehicle occupant restraining system comprising a storage container having a chamber formed therein, the chamber containing gas stored under a high pressure and having an internal wall surface bearing a coating of a material with a high specific surface area.

2. The compressed gas storage means as claimed in claim 1, wherein said material is an oxide or a molecular sieve.

3. The compressed gas storage means as claimed in claim 2, wherein said material is a zeolite.

4. The compressed gas storage means as claimed in claim 1, wherein said material has a specific surface area of 200 to 400 $m^2/g$.

* * * * *